(12) United States Patent
Roy et al.

(10) Patent No.: US 8,498,287 B2
(45) Date of Patent: Jul. 30, 2013

(54) WIRELESS COMMUNICATION METHOD AND SYSTEM FOR ROUTING PACKETS VIA INTRA-MESH AND EXTRA-MESH ROUTES

(75) Inventors: Vincent Roy, Longueuil (CA); Juan Carlos Zuniga, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 130 days.

(21) Appl. No.: 13/154,802

(22) Filed: Jun. 7, 2011

(65) Prior Publication Data

US 2011/0235516 A1    Sep. 29, 2011

Related U.S. Application Data

(63) Continuation of application No. 11/257,560, filed on Oct. 25, 2005, now Pat. No. 7,957,277.

(60) Provisional application No. 60/656,303, filed on Feb. 25, 2005.

(51) Int. Cl.
*H04L 12/28* (2006.01)
*H04L 12/56* (2006.01)

(52) U.S. Cl.
USPC .......................... 370/351; 370/392; 370/400

(58) Field of Classification Search
None
See application file for complete search history.

(56) References Cited

U.S. PATENT DOCUMENTS

| | | | |
|---|---|---|---|
| 5,781,534 A | 7/1998 | Perlman et al. | |
| 6,307,843 B1 | 10/2001 | Okanoue | |
| 6,954,435 B2 | 10/2005 | Billhartz et al. | |
| 6,977,938 B2 | 12/2005 | Alriksson et al. | |
| 7,295,806 B2 | 11/2007 | Corbett et al. | |
| 7,502,332 B1 * | 3/2009 | Chen | 370/255 |
| 7,586,894 B2 | 9/2009 | Aoki et al. | |
| 2004/0008663 A1 | 1/2004 | Srikrishna et al. | |
| 2004/0190454 A1 | 9/2004 | Higasiyama | |
| 2004/0246975 A1 | 12/2004 | Joshi | |
| 2004/0252643 A1 * | 12/2004 | Joshi | 370/238 |
| 2005/0099943 A1 * | 5/2005 | Naghian et al. | 370/229 |
| 2005/0122955 A1 | 6/2005 | Lin et al. | |
| 2006/0031576 A1 | 2/2006 | Canright | |
| 2006/0109815 A1 | 5/2006 | Ozer et al. | |

(Continued)

FOREIGN PATENT DOCUMENTS

| | | |
|---|---|---|
| CN | 1 173 954 A | 2/1998 |
| EP | 0 999 717 | 5/2000 |

(Continued)

OTHER PUBLICATIONS

Notification of Transmittal of International Preliminary Report on Patentability for PCT/US2006/004411, Aug 28, 2007, 5 pages.

(Continued)

*Primary Examiner* — Otis L Thompson, Jr.
*Assistant Examiner* — Ashley Shivers
(74) *Attorney, Agent, or Firm* — Theodore Naccarella

(57) ABSTRACT

A method and apparatus for routing a packet implemented in a mesh point (MP) of a wireless network are described. According to the method, a plurality of intra-mesh and extra-mesh routes are compared. One of the plurality of intra-mesh and extra-mesh routes is selected for transmission of the packet based on at least one criterion. The packet is transmitted over the selected one of the plurality of intra-mesh and extra-mesh routes.

8 Claims, 3 Drawing Sheets

U.S. PATENT DOCUMENTS

| | | |
|---|---|---|
| 2006/0125703 A1 | 6/2006 | Ma et al. |
| 2006/0146718 A1 | 7/2006 | Yarvis et al. |
| 2006/0146846 A1 | 7/2006 | Yarvis et al. |
| 2009/0310488 A1 | 12/2009 | Mighani et al. |

FOREIGN PATENT DOCUMENTS

| | | |
|---|---|---|
| JP | 2004-201140 | 7/2004 |
| WO | WO-96/21983 | 7/1996 |
| WO | 2005/006128 | 1/2005 |

OTHER PUBLICATIONS

EP 06 73 4572, Search Report, Oct. 5, 2009, 7 pages.
"Chinese Office Action", Application No. 200910205010.8, 6 pages (see item 6 below).
"Chinese Office Action (Translation)", Application No. 200910205010.8, 8 pages.
"International Search Report", PCT/US06/04411, Mar. 2, 2007, 3 pages.
IEEE Wireless LAN Edition—A compilation based on IEEE Std. 802.11™—1999 (R2003) and its amendments, Sep. 19, 2003.
Raniwala et al., "Evaluation of a Wireless Enterprise Backbone Network Architecture," 12$^{th}$ Annual IEEE Symposium on High Performance Interconnects, pp. 98-104 (Aug. 2004).
Takasugi et al., "Technology for Service Continuity Adapting to Dynamic Environment Seamlessly," IPSJ Journal, vol. 46, No. 2, pp. 608-623 (Feb. 2005).
"Chinese Second Notification of Office Action and Search Report", dated Aug. 23, 2012, Chinese Patent Application No. 200910205011.2, 7 pages (See item 3 below).
"Chinese Second Notification of Office Action and Search Report (Translation)", dated Aug. 23, 2012, Chinese Patent Application No. 200910205011.2, 8 pages.

* cited by examiner

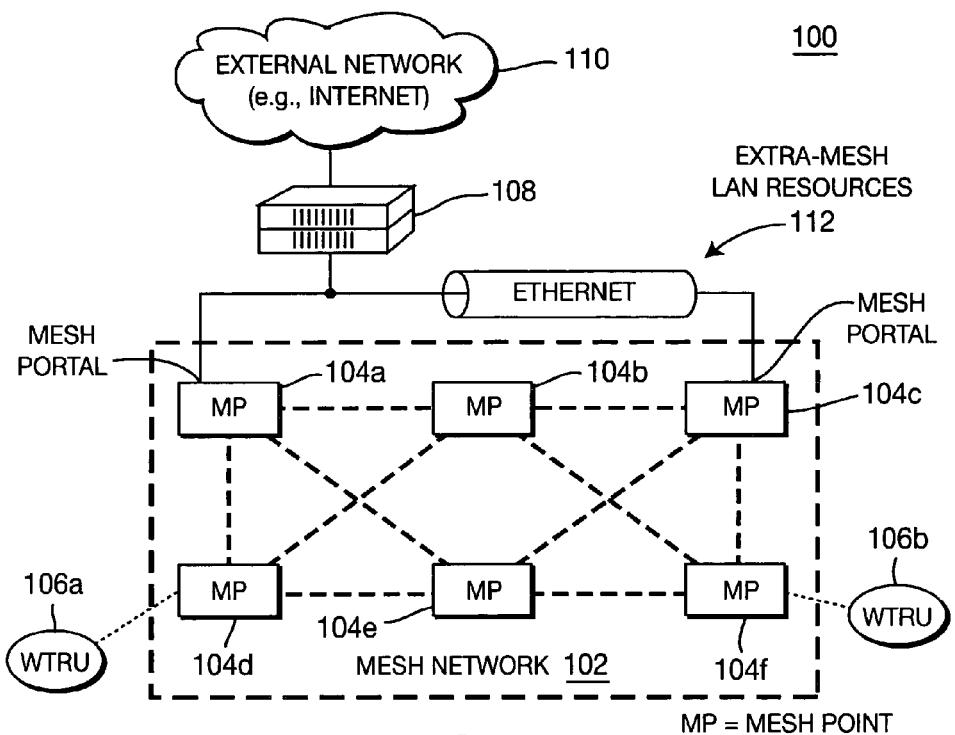
FIG. 1
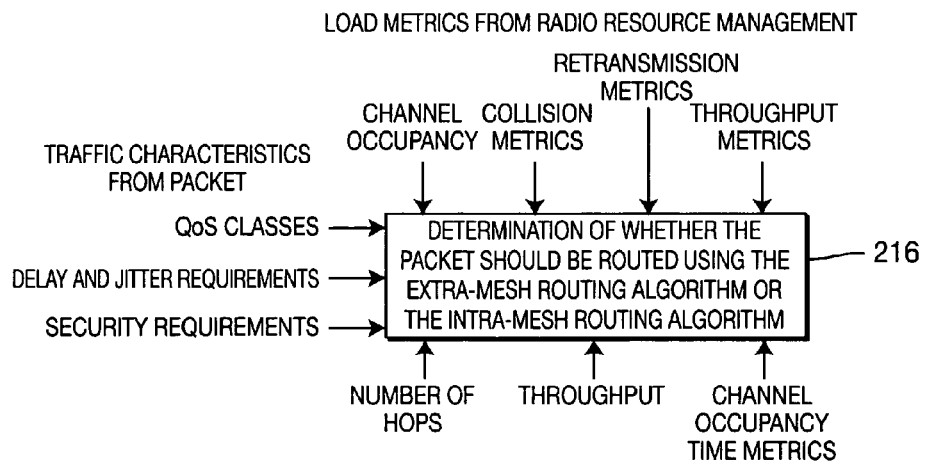
FIG. 3  ROUTE METRICS FROM PROBING PROCEDURE
(ALLOWS COMPARISON OF INTRA-MESH ROUTING AND EXTRA-MESH ROUTING)

WIRELESS COMMUNICATION METHOD AND SYSTEM FOR ROUTING PACKETS VIA INTRA-MESH AND EXTRA-MESH ROUTES

CROSS REFERENCE TO RELATED APPLICATIONS

This application is a continuation of U.S. patent application Ser. No. 11/257,560 filed Oct. 25, 2005, which claims the benefit of U.S. Provisional Application Ser. No. 60/656,303, filed Feb. 25, 2005, the contents of which are incorporated by reference herein.

FIELD OF THE INVENTION

The present invention is related to a wireless communication system including a mesh network and an external network. More particularly, the present invention is related to routing packets via intra-mesh and extra-mesh routes.

BACKGROUND

A wireless communication system typically includes a plurality of access points (APs), (i.e., base stations) which are connected to each other through a wired network, (i.e., a backhaul network). In some cases, directly connecting a given AP to the wired network is more desirable than indirectly connecting the AP to the wired network by relaying a data packet to and from neighboring APs, such as in a mesh network.

A mesh wireless local area network (WLAN), (i.e., mesh network), includes a plurality of mesh points (MPs), each of which is connected to one or more neighboring MPs with wireless links such that a data packet may be routed using the intra-mesh radio resources via one or more hops to a destination. The mesh network has an advantage of ease and speed of deployment because radio links between MPs can be deployed without having to provide a backhaul wired network for each AP.

A mesh network usually belongs to a bigger local area network (LAN) which can include different types of LAN technologies, (e.g., IEEE 802.3 Ethernet, IEEE 802.5 Token Ring, IEEE 802.11 WLAN, or the like). A mesh portal is an MP that provides interconnectivity between the mesh network and the rest of the LAN. The LAN resources that do not belong to the mesh network are referred to as extra-mesh LAN resources. A mesh network having two or more mesh portals is a multi-portal mesh network. In a multi-portal mesh network, the portals could be interconnected via the extra-mesh LAN resources.

Two types of traffic exist in a mesh network: Intra-mesh traffic that is destined to nodes within the mesh network, and extra-mesh traffic that is destined to nodes lying outside of the mesh network. A mesh network that does not have a mesh portal can only support intra-mesh traffic, since with no mesh portal there is no way for the packet to be forwarded outside of the mesh. On the other hand, a mesh network with one or more mesh portals can support both intra-mesh traffic and extra-mesh traffic.

Routing intra-mesh traffic is referred to as intra-mesh routing and consists of determining the best path between any two MPs of the mesh network throughout the mesh. Similarly, routing extra-mesh traffic is referred to as extra-mesh routing and consists of determining the best path between any MP and its best, (e.g., closest), mesh portal.

Although a mesh network is advantageous in terms of its ease of deployment and low cost of establishing a backhaul network, the radio resource capacity of the mesh network is limited. Since the mesh network can use multiple hops between MPs to relay a packet from one node to another, a large portion of the channel capacity is used to support the wireless backhaul. Thus, the capacity of the mesh network decreases exponentially as the number of hops that the packets need to reach their destination increases.

SUMMARY

A method and apparatus for routing a packet implemented in a mesh point (MP) of a wireless network are described. According to the method, a plurality of intra-mesh and extra-mesh routes are compared. One of the plurality of intra-mesh and extra-mesh routes is selected for transmission of the packet based on at least one criterion. The packet is transmitted over the selected one of the plurality of intra-mesh and extra-mesh routes.

BRIEF DESCRIPTION OF THE DRAWINGS

A more detailed understanding of the invention may be had from the following description of a preferred embodiment, given by way of example and to be understood in conjunction with the accompanying drawing wherein:

FIG. 1 shows an exemplary wireless communication system including a mesh network with two mesh portals in accordance with the present invention;

FIG. 3 shows exemplary inputs for determining in the process of FIG. 2 whether packets should be routed using an extra-mesh routing algorithm or an intra-mesh routing algorithm;

DETAILED DESCRIPTION

Figure 2:
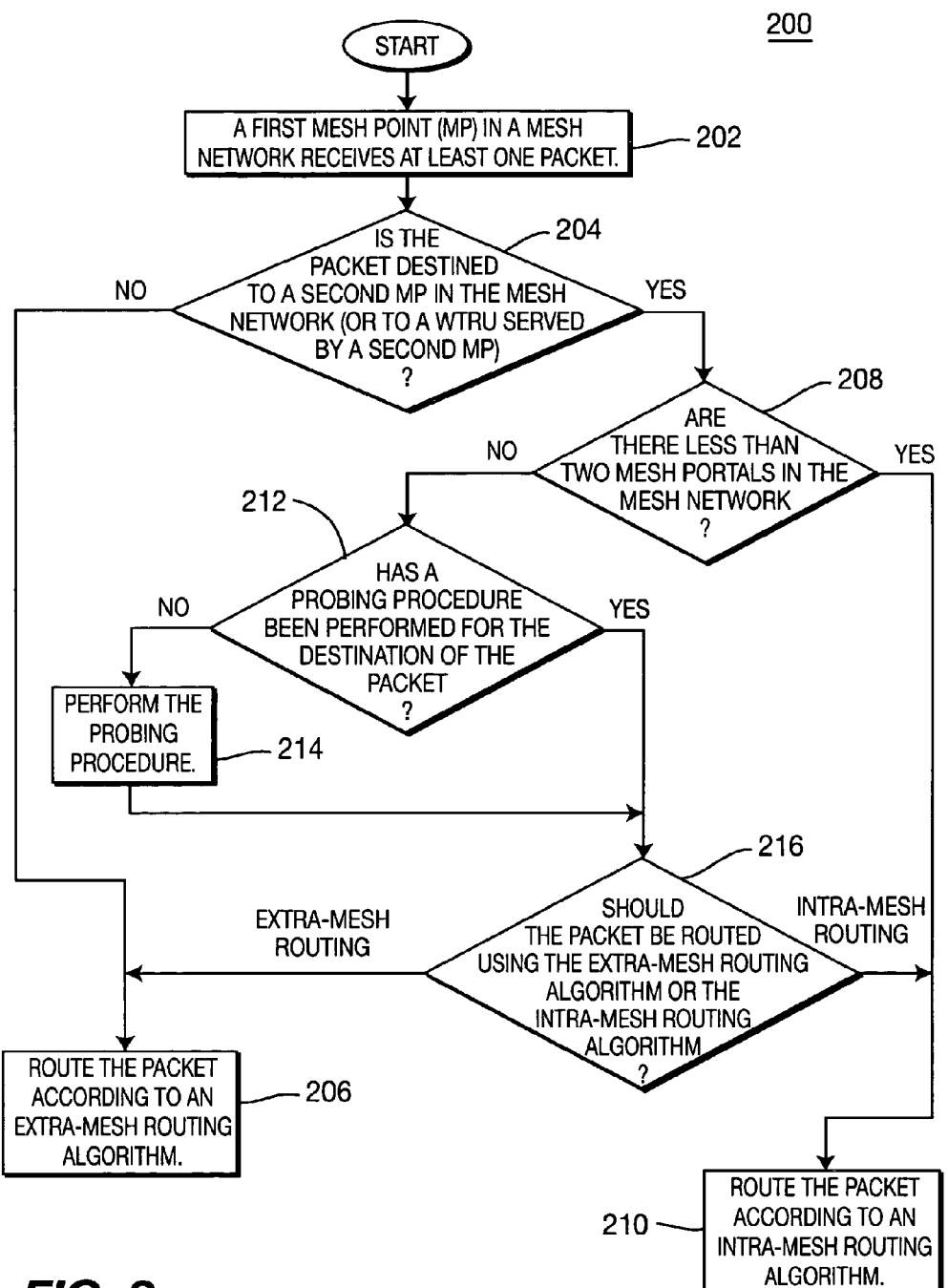
FIG. 2 is a flow diagram of a process including method steps for managing intra-mesh and extra-mesh radio resources jointly in accordance with the present invention.

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "MP" includes but is not limited to a base station, a Node-B, a site controller, a wireless station, an AP or any other type of interfacing device used in a wireless environment.

The features of the present invention may be incorporated into an integrated circuit (IC) or be configured in a circuit comprising a multitude of interconnecting components.

FIG. 1 shows an exemplary wireless communication system 100 in accordance with the present invention. The wireless communication system 100 includes a mesh network 102 having a plurality of MPs 104a-104f, a plurality of WTRUs 106a, 106b, a router 108 and an external network 110, (e.g., a wide area network (WAN) such as the Internet).

In the example of FIG. 1, two of the MPs 104 in the mesh network 102 are mesh portals 104a and 104c. The mesh portals 104a and 104c are connected to extra-mesh LAN resources 112, (such as Ethernet), to enable access to the network 110 via the router 108 such that a data packet may be forwarded through the extra-mesh LAN resources 112 between the mesh portals 104a and 104c. For example, if the MP 104*d* needs to send a packet to MP 104*c*, the packet would normally be routed through either MP 104*b* or MP 104*e*, which will then forward it to 104*c*. In accordance with the present invention, the packet may be forwarded to MP 104*c* via MP 104*a* and the extra-mesh wired LAN resources 112. Thus, the radio resources of the mesh are relieved by capitalizing on the wired link between the two mesh portals 104*a* and 104*c*.

Although FIG. 1 illustrates six MPs 104 and two WTRUs 106 as an example, more or less MPs 104 may be implemented, and more or less WTRUs 106 may exist in the wireless communication system 100. Each of the MPs 104*a*-104*f* is connected to at least one neighboring MP 104 such that a data packet sent from a source, such as the WTRU 106*a*, may be forwarded through the mesh network 102 to a destination, such as the WTRU 106*b*, via one or more hops.

FIG. 2 is a flow diagram of a process 200 including method steps for managing intra-mesh and extra-mesh radio resources jointly in accordance with the present invention. When a first one of the MPs 104 in the mesh network 102 receives at least one packet (step 202), the MP 104 determines whether the packet is destined to a second MP 104 in the mesh network 102 or to a WTRU 106*a*, 106*b* being served by the second MP 104 (step 204).

If it is determined at step 204 that the packet is not destined to a second MP 104 in the mesh network 102 or to one of the WTRUs 106*a*, 106*b*, the packet is routed according to an extra-mesh routing algorithm (step 206). For example, the extra-mesh routing may be used to facilitate web-browsing, (i.e., communicating with a server external to the mesh network 102, such as the network 110 of FIG. 1).

If it is determined at step 204 that the packet is destined to a second MP in the mesh network 102 or to one of the WTRUs 106*a*, 106*b*, it is further determined at step 208 whether or not there are less than two (2) mesh portals in the mesh network 100. The number of mesh portals can be determined when setting up the mesh network 102, accessing a configuration parameter database or the like. If there are less than two (2) mesh portals in the mesh network 102, the packet is routed according to an intra-mesh routing algorithm (step 210). If there are at least two (2) mesh portals in the mesh network 102, it is determined whether a probing procedure has been performed for the destination of the packet (step 212). The probing procedure is performed such that the first MP 104 may obtain necessary metrics for the specific destination indicated by the packet header to be able to decide whether the packet should be routed using intra-mesh resources or extra-mesh resources.

If it is determined at step 212 that a probing procedure has not been performed and therefore the necessary metrics are not available, a probing procedure is performed at step 214.

If it is determined at step 212 that a probing procedure has been performed for the destination of the packet and therefore the necessary metrics are already available, or after the necessary metrics are obtained by performing the probing procedure at step 214, it is further determined at step 216 whether the packet should be routed using the extra-mesh routing algorithm at step 206 or the intra-mesh routing algorithm at step 210.

FIG. 3 shows exemplary inputs for determining at step 216 of the process 200 of FIG. 2 whether packets should be routed using the extra-mesh routing algorithm or the intra-mesh routing algorithm. Criteria used to make the determination of step 216 include, but are not limited to, load metrics obtained from a radio resource management entity, traffic characteristics from the packet and route metrics obtained from the probing procedure. The load metrics include, but are not limited to, channel occupancy, a collision rate, a retransmission rate, throughput, or the like. The traffic characteristics include, but are not limited to, delay and jitter requirements of the packet, a quality of service (QoS) access class of the packet and security requirements. The route metrics include, but are not limited to, the number of hops, throughput and estimated channel occupancy time, (which can be estimated from the packet length and the throughput of each hop for each route). The route metrics allow comparison of intra-mesh routes and extra-mesh routes. The determination of which route to take is typically based on one or a combination of the metrics described above. For example, if the only metric of importance in a given implementation is the delay associated to a route, the route that would offer the smallest delay would be used to forward the packet to its destination.

Referring to FIG. 1, each MP 104, or alternatively a centralized controlling entity, determines what would be advantageous for the packet between intra-mesh routing and extra-mesh routing based on at least one of these inputs. Continuing with the previous example where MP 104*d* needs to send a packet to MP 104*c*, a preferred route is determined by comparing the delay associated with each possible route and selecting the route which offers the smallest delay. This is done using the delay metrics collected by the probing procedure illustrated in FIG. 4. In a typical mesh system, the potential routes would include MPs 104*d*-104*b*-104*c*, MPs 104*d*-104*e*-104*c*, MPs 104*d*-104*e*-104*f*-104*c*, or the like. In accordance with the present invention, all these routes are possible. However, routes that use the extra-mesh LAN resources may be considered. One example of such route is: MP 104*d*-104*a*-112-104*c*. Thus, a route, whether a pure intra-mesh route or one that capitalizes on the extra-mesh LAN resources 112, such as the route 104*d*-104*a*-112-104*c*, is selected based on which route offers the smallest delay.

Figure 4:
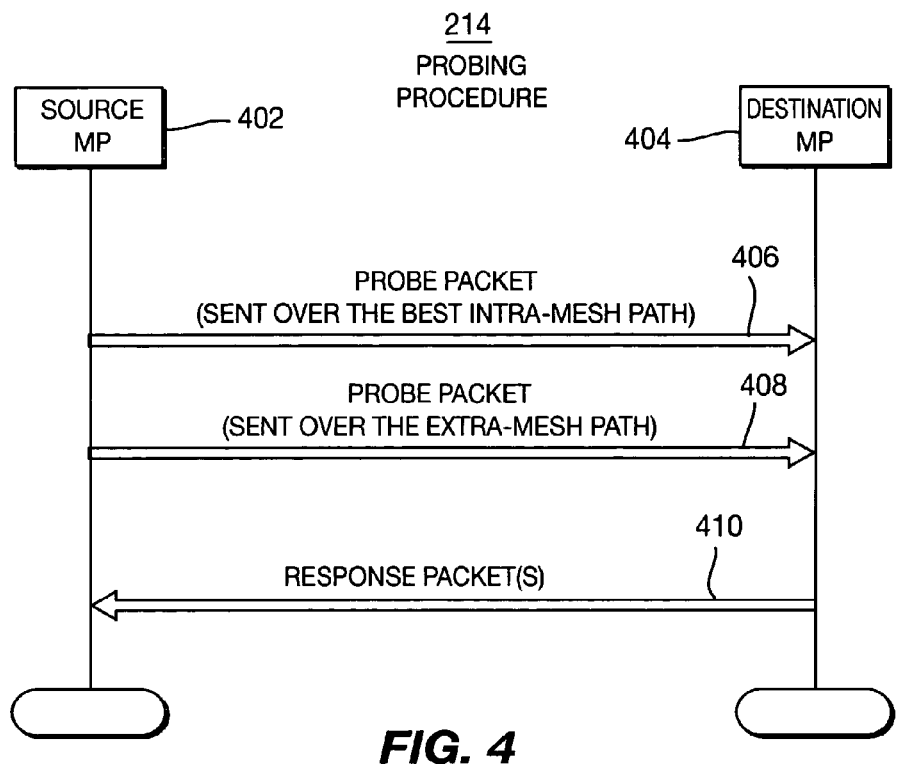
FIG. 4 is a signaling diagram for managing intra-mesh and extra-mesh radio resources jointly in accordance with the present invention.

FIG. 4 is a signaling diagram of a probing process performed in step 214 of the process 200 of FIG. 2 in accordance with the present invention. In the probing procedure 214, a set of probe packets are sent from a source MP 402 to a destination MP 404 over different paths that are to be measured. If the mesh network 102 routes the packet in a connectionless fashion, (i.e., a system where the route that a packet takes to go from the source node to the destination node is not pre-determined and is the end-result of routing decisions taken at each intermediate node between the source node and the destination node), the probing procedure 214 is performed at each MP 104. If the packet is routed in a connection-oriented fashion, (i.e., a system where the route that a packet takes to go from the source node to the destination node is known prior to the packet leaving the source node), the probing needs to be performed only at the first MP, (i.e., the source MP 402).

As shown in FIG. 4, the source MP 402 uses a routing function, (i.e., algorithm), to send a first probe packet to a destination MP 404 over a "best" intra-mesh path 406, and also send a second probe packet over an extra-mesh path 408 via two mesh portals to the destination MP 404. After receiving both of the probe packets, the destination MP 404 compiles the statistics collected by the two probes packets over the routes 406 and 408, and the associated metrics, (e.g., number of hops, network delay, average throughput, or the like), to generate a consolidated response packet 410 which is sent from the destination MP 404 to the source MP 402. Alternatively, the destination MP 404 may generate individual response packets 410 for each of the probe packets it receives over the paths 406 and 408.

Upon reception of two response packets 410, the source MP 402 may compare the arrival time of the response packets 410. Alternatively, or in addition to, the MP 402 may compare the information included in each of the probe packets. The comparison may be based on information encapsulated inside the packets that has been updated by the nodes along the path, (e.g., number of hops).

For end-to-end delay measurements, a timestamp may be used. When the source MP 402 sends the probe packets, the source MP 402 stamps the probe packets with the transmission time. The destination MP 404 then receives the probe packet and stores the time marked in the probe packet as well as the local time at which the probe packet was received. The same process is repeated for all subsequent probe packets. Once all of the probe packets are received, the difference between the local time and the stamped time is calculated and a list is made with the paths, ordered by the difference value. Since the time is reported as a time difference, the source MP 402 and the destination MP 404 need not be fully synchronized.

Different measurements may be taken with the probing procedure 214. Information in the probe packet may include, but is not limited to, at least one of timestamp, number of expected probes, a maximum rate on path, a minimum rate on path, an average rate on path, number of hops within mesh and a load/congestion indicator. The information in the response packet may include, but is not limited to, at least one of timestamp, time difference between probe packets, number of received probe packets, a maximum rate on path, a minimum rate on path, an average rate on path, number of hops within mesh and a load/congestion indicator.

Even though the signaling of FIG. 4 is shown as a single-way process, (i.e., from the source MP 402 to the destination MP 404), the paths for the probe packet and the response packet may not be same. A similar process may be performed in order to make an evaluation of the return path. The process can be extended to a two-way process if responses are combined with new probe packets.

Figure 5:
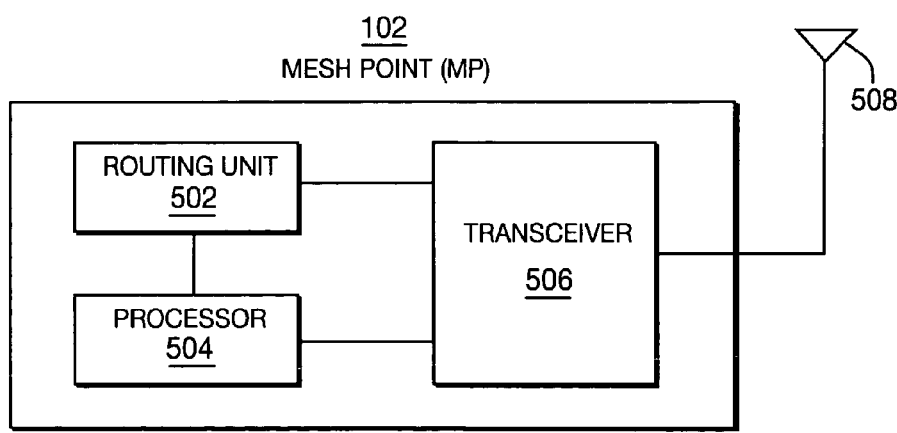
FIG. 5 is a block diagram of an MP in accordance with the present invention.

FIG. 5 is a block diagram of an MP 102 in accordance with the present invention. The MP 102 includes a routing unit 502, a processor 504, a transceiver 506 and an antenna 508. The routing unit 502 determines the best route in accordance with an intra-mesh routing algorithm or an extra-mesh routing algorithm for a given destination. The processor 504 determines whether the packet should be routed through only intra-mesh resources or through extra-mesh resources, as explained hereinabove. Packets are transmitted and received through the transceiver 506 and the antenna 508 in accordance with the routing unit 502 and the processor 504.

Although the features and elements of the present invention are described in the preferred embodiments in particular combinations, each feature or element can be used alone without the other features and elements of the preferred embodiments or in various combinations with or without other features and elements of the present invention

What is claimed is:

1. A method of routing a packet implemented in a mesh point (MP) of a wireless network, the method comprising:
    comparing a plurality of intra-mesh and extra-mesh routes;
    selecting one of the plurality of intra-mesh and extra-mesh routes over which to transmit the packet based on at least one criterion; and
    transmitting the packet over the selected one of the plurality of intra-mesh and extra-mesh routes;
    wherein the at least one criterion comprises at least a quality of service (QoS) access class of the packet and a number of hops.

2. The method of claim 1, wherein the at least one criterion further comprises at least one of a channel occupancy, a collision rate, a retransmission rate and a throughput for each of the plurality of intra-mesh and extra-mesh routes.

3. The method of claim 1, wherein the at least one criterion further comprises at least one of a delay requirement of the packet, a jitter requirement of the packet, and a security requirement of the packet.

4. The method of claim 1, wherein the at least one criterion further comprises at least one of, throughput and an estimated channel occupancy time associated with each of the plurality of intra-mesh and extra-mesh routes.

5. A mesh point (MP) comprising:
    a receiver configured to receive a packet;
    a processer configured to:
    compare a plurality of intra-mesh and extra-mesh routes, and
    select one of the plurality of intra-mesh and extra-mesh routes over which to transmit the packet based on at least one criterion; and a transmitter configured to transmit the packet over the selected one of the plurality of intra-mesh and extra-mesh routes;
    wherein the at least one criterion comprises at least a quality of service (QoS) access class of the packet and a number of hops.

6. The mesh point of claim 5, wherein the at least one criterion further comprises at least one of a channel occupancy, a collision rate, a retransmission rate and a throughput for each of the plurality of intra-mesh and extra-mesh routes.

7. The mesh point of claim 5, wherein the at least one criterion further comprises at least one of a delay requirement of the packet, a jitter requirement of the packet, and a security requirement of the packet.

8. The mesh point of claim 5, wherein the at least one criterion further comprises at least one of, throughput and an estimated channel occupancy time associated with each of the plurality of intra-mesh and extra-mesh routes.

* * * * *